United States Patent [19]

Yamada et al.

[11] Patent Number: 5,324,807
[45] Date of Patent: Jun. 28, 1994

[54] CURABLE RESIN COMPOSITION

[75] Inventors: Mitsuo Yamada, Suita; Hiroharu Ohsugi, Hirakata; Mitsuhiro Takarada; Yuji Yoshikawa, both of Annaka, all of Japan

[73] Assignees: Shin-Etsu Chemical Co., Ltd., Tokyo; Nippon Paint Co., Ltd., Osaka, both of Japan

[21] Appl. No.: 950,605

[22] Filed: Sep. 28, 1992

[30] Foreign Application Priority Data

Sep. 27, 1991 [JP] Japan .................................. 3-276965

[51] Int. Cl.$^5$ .............................................. C08L 83/05
[52] U.S. Cl. .................................... 528/100; 525/446; 525/480; 525/523; 528/25; 528/29; 528/15
[58] Field of Search ................. 525/29, 100, 446, 480, 525/523; 528/15, 25, 26, 27, 29, 31

[56] References Cited

U.S. PATENT DOCUMENTS

| | | | |
|---|---|---|---|
| 3,882,083 | 5/1975 | Berger et al. | 528/15 |
| 4,139,519 | 2/1979 | Itoh et al. | 525/105 |
| 5,010,137 | 4/1991 | Umeda et al. | 525/104 |
| 5,081,199 | 1/1992 | Okinoshima | 528/15 |
| 5,194,501 | 3/1993 | Babu et al. | 575/103 |
| 5,208,289 | 5/1993 | Takarada et al. | 575/100 |

OTHER PUBLICATIONS

Polymer Letters, vol. 11, pp. 327-332 (1973).

Primary Examiner—Ralph H. Dean
Attorney, Agent, or Firm—Millen, White, Zelano & Branigan

[57] ABSTRACT

A curable resin composition comprising (a) an acrylic, polyester, epoxy or polyol resin having a plurality of alkynyl groups, (b) an organohydrogenpolysiloxane, and (c) an amount of platinum catalyst effective to catalyze the crosslink reaction between (a) and (b). The composition is useful for coating and molding purposes and gives a cured product having excellent acid resistance, water resistance and other properties.

19 Claims, No Drawings

CURABLE RESIN COMPOSITION

FIELD OF THE INVENTION

This invention relates to a novel curable resin composition. More particularly, it relates to a novel curable resin composition having excellent acid-resistance and other physico-chemical properties.

BACKGROUND OF THE INVENTION

Heretofore a variety of curable resin compositions are known including those comprising hydroxyl group containing acrylic or polyester polymers and a crosslinker such as melamine resins or organic polyisocyanates. The melamine resin-crosslinking compositions require relatively high curing temperatures as high as 150°–230° C. This makes the composition less workable and uneconomical in use. Besides the melamine resin-crosslinking system must suffer not only from volumetric shrinkage upon curing due to the emanation of lower alkanol by-products but also from a decreased weatherability due to the presence of triazine nuclei. The polyisocyanate-crosslinking system has problems of toxicity and decreasing weatherability with time.

Japanese Laid Open (Kokai) Patent Application Nos. 36109/82 and 155660/83 disclose a system having an enhanced weatherability comprising room temperature-curable alkoxysilyl group-bearing acrylic polymers. This system has certain defects that the curing reaction proceeds slowly, that the cured product can be blotted with by-products produced by the hydrolysis of residual alkoxysilyl groups and that its rust prevention property is not satisfactory.

Japanese Patent Publication (Kokoku) No. 33152/88 discloses a thermosetting resin system utilizing a reaction between an alkoxysilyl component and a hydroxyl group-containing resin component. This system is also disadvantageous in that its curing reaction proceeds slowly and the resulting cured film exhibits a poor salt spray resistance.

It has long been known in the art to crosslink vinylpolysiloxanes with organohydrogenpolysiloxanes in the presence of a platinum catalyst. Unfortunately, the cured product of this composition is swellable with conventional organic solvents and thus exhibits poor solvent resistance as well as poor alkali resistance. This composition also has a poor overlaying property when used for coating purposes. These defects have precluded the composition from its application to coating compositions of general use. Attempts have been made to improve the overlaying property of vinylpolysiloxane based compositions by incorporating propylalkoxysiloxane-modified polyester (e.g. Japanese Laid Open Patent Application No. 263265/87) or using alkoxysilylalkylpolysiloxanes as a crosslinking agent (e.g. Japanese Laid Open Patent Application No. 127733/86). Even these attempts, a composition satisfying with mechanical strength properties, compatibility with other resins, overlaying properties etc., has not been discovered yet.

Furthermore, emission of organic solvents from coating compositions to the atmosphere has become a current problem for environmental reasons.

We have found that when crosslinking unsaturated organic polymers utilizing their addition reaction with organo-hydrogenpolysiloxanes, the resulting film may be greatly improved in various properties including weatherability, solvent, alkali resistance, acid resistance, waterproofness, salt spray resistance, rust preventive property, anti-blotting property, overlaying property and so on. We have also found that when using the above composition for coating purposes, the use of organic solvents may be dispensed with. The present invention has its basis on these findings.

Accordingly, it is an object of this invention to provide a curable resin composition which is excellent in weatherability, acid resistance, alkali resistance, waterproofness, salt spray resistance, solvent resistance, overlaying property and so on.

It is another object of this invention to provide a curable resin composition which is curable at relatively low temperatures without volumetric shrinkage and thus may also be used for molding purposes.

It is a further object of this invention to provide a curable resin composition which may be used for coating purposes as solventless or high solids coating compositions.

SUMMARY OF THE INVENTION

The above and other objects may be accomplished by providing, in accordance with this invention, a curable resin composition comprising:

(a) an acrylic, polyester, epoxy or polyol resin having a number average molecular weight from 200 to 100,000 and a plurality of alkynyl groups in the molecule;

(b) an organohydrogenpolysiloxane having a plurality of silicon-hydrogen bonds in the molecule; and (c) a catalytically effective amount of a platinum catalyst.

The curing reaction of the resin composition of this invention proceeds even at relatively low temperatures with no or little volumetric shrinkage. The curing mechanism is a reaction between the alkynyl group and the hydrosilyl group to form a linkage: Si—C=C—. Accordingly, the resulting cured product has excellent acid resistance, solvent resistance, waterproofness and overlaying property.

DETAILED DESCRIPTION OF THE INVENTION

Resins usable in this invention as component (a) must have a plurality of alkynyl groups, typically ethynyl or propargyl, in the molecule.

Alkynyl group-containing acrylic resins may be produced by copolymerizing an alkynyl group-containing acrylic monomer and another monomer copolymerizable therewith. Examples of alkynyl group-containing monomers include propargyl (meth)acrylate, propargyl (meth)acryloylcarbamate, 2-propargyloxycarbonyloxyethyl (meth)acrylate and the like. These alkynyl group-containing acrylic monomers may be produced, for example, by reacting (meth)acryloyl chloride with an acetylenic alcohol such as propargyl alcohol, transesterifying a lower alkyl (meth)acrylate, with an acetylenic alcohol such as propargyl alcohol, reacting (meth)acryloylisocyanate with an acetylenic alcohol such as propargyl alcohol, or reacting 2-hydroxyethyl (meth) acrylate with propargyl chloroformate.

Examples of other monomers to be copolymerized with the alkynyl group-containing acrylic monomer include, inter alia, acrylic monomers such as methyl (meth)acrylate, ethyl (meth)acrylate, n-butyl (meth)acrylate, isobutyl (meth) acrylate, t-butyl meth acrylate, 2-ethylhexyl meth) acrylate, lauryl (meth)acrylate, phenyl (meth)acrylate, benzyl (meth)acrylate, 2-hydroxyethyl (meth)acrylate, 2-hydroxypropyl (meth)acrylate, 4-hydroxybutyl (meth) acrylate, adduct of 2-hydroxyethyl (meth)acrylate and ε-caprolactone (e.g. PLACCEL FM1 sold by Daicel Chemical Industries, Ltd.), glycidyl (meth)acrylate, 3-trimethoxysilylpropyl (meth)acrylate, 3-triethoxysilylpropyl (meth)acrylate, 3-dimethoxymethylsilylpropyl (meth) acrylate, (meth)acrylic acid, 2-acryloylamino-2-methylpropane sulfonic acid, acid phosphoxypropyl (meth) acrylate, tributyltin (meth)acrylate, (meth)acrylamide, (meth)acryloylisocyanate, 2-isocyanatoethyl (meth)acrylate and the like. Other copolymerizable monomers include styrene, α-methylstyrene, itaconic acid, maleic acid, vinyl acetate, allyl acetate, vinyltrimethoxysilane, vinyltriethoxysilane, vinylmethyldimethoxysilane, vinylmethyldiethoxysilane and the like. These non-acrylic monomers are preferably used in a proportion less than 50% by weight.

Other methods for producing alkynyl group-containing acrylic resins include reaction of hydroxyl group-containing acrylic resins with alkynyl chloroformates (e.g. propargyl chloroformate) or alkynoic acids (e.g. propargilic acid), reaction of isocyanato group-containing acrylic resins with acetylenic alcohols (e.g. propargyl alcohol), reaction of carboxyl group-containing acrylic resins with alkynyl group-containing epoxide compounds (e.g. propargyl glycidyl ether), and epoxide group-containing acrylic resins with alkynoic acid (e.g. propargylic acid).

Hydroxyl group-containing acrylic resins may be produced by polymerizing hydroxyl group-containing acrylic monomers such as 2-hydroxyethyl (meth)acrylate, 4-hydroxybutyl (meth)acrylate, or adduct of 2-hydroxyethyl (meth)acrylate and ε-caprolactone (e.g. PLACCEL FM series), or copolymerizing the hydroxyl group-containing acrylic monomer with copolymerizable acrylic and/or non-acrylic monomers.

Isocyanato group-containing acrylic resins may be produced by polymerizing isocyanato group-containing acrylic monomers such as (meth)acryloylisocyanate or 2-isocyanatoethyl (meth)acrylate, or copolymerizing the isocyanato group-containing acrylic monomer with copolymerizable acrylic and/or non-acrylic monomers.

Carboxyl group-containing acrylic resins may be produced by polymerizing (meth)acrylic acid and/or other carboxylic acid monomers such as itaconic or maleic acid, or copolymerizing the carboxylic acid monomer with copolymerizable acrylic and/or non-acrylic monomers.

Likewise epoxide group-containing acrylic resins may be produced by polymerizing epoxide group-containing acrylic monomers such as glycidyl (meth)acrylate, or copolymerizing the epoxide group-containing acrylic monomer with copolymerizable acrylic and/or non-acrylic monomers.

Alkynyl group-containing polyester resins may be produced by the polycondensation reaction of the above-mentioned acetylenic alcohols such as propargyl alcohol, a polyol component and a polycarboxylic acid component. Examples of polyols usable in the polycondensation reaction include ethylene glycol, propylene glycol, 1, 6-hexanediol, diethylene glycol, neopentyl glycol, neopentyl glycol hydroxypivalate, trimethylolpropane, alcoholic hydroxyl group-terminated dimethylsiloxane and the like. Examples of polycarboxylic acids include phthalic anhydride, isophthalic acid, terephthalic acid, adipic acid, azelaic acid, trimellitic acid and the like. A small proportion of monoalcohols or monocarboxylic acid may be incorporated as desired. Alternatively, alkynyl group-containing polyester resins may be produced by reacting a carboxyl group-terminated polyester derived from the above-mentioned polyol and polycarboxylic acid components with an alkynyl group-containing epoxide compound such as propargyl glycidyl ether, or reacting a hydroxyl group-terminate polyester with an alkynoic acid such as propargylic acid.

Alkynyl group-containing epoxy resins may be produced by reacting, for example, bisphenol A diglycidyl ether with an alkynoic acid such as propargylic acid, or reacting an epoxy resin having a plurality of hydroxyl groups with an alkynyl chloroformate such as propargyl chloroformate. Alkynyl group-containing polyol resins or compounds may be produced by reacting a polyol with an alkynyl halide such as propargyl bromide or an alkynyl chloroformate such as propargyl chloroformate in the presence of an acid acceptor such as tertiary amines. Examples of usable polyols include aromatic polyols such as novolac resins, bisphenol A, bisphenol F, or bisphenol S, and aliphatic polyols such as neopentyl glycol, 1,6-hexanediol, polyoxyalkylenepolyols and the like.

The above alkynyl group-containing acrylic, polyester, epoxy or polyol resin to be used as component (a) in this invention should have a number average molecular weight from 200 to 100,000, preferably from 500 to 50,000. This is because if the molecular weight is too low, the resin is deficient in film-forming property or the resulting film is not strong enough. Conversely if the molecular weight is too high, the resin is too viscous to give an acceptable workability or a high solids composition.

The organohydrogenpolysiloxane component (b) of this invention should have at least two silicon-hydrogen bonds in the molecule. The component (b) acts as a crosslinker of component (a) through the hydrosilylation reaction of the alkynyl group possessed by component (a). Included in usable organohydrogenpolysiloxanes are those represented by one of the following formulas (I), (II) and (III).

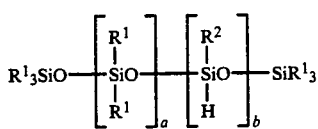
(I)

wherein $R^1$ and $R^2$ are each a $C_1$–$C_6$ alkyl or phenyl, a is zero or an integer up to 100, and b is an integer from 2 to 100.

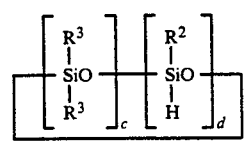
(II)

wherein $R^2$ is as defined, $R^3$ is the same as $R^2$, c is zero or an integer up to 8, d is an integer from 2 to 10, and the sum of c+d equals to 3 to 10.

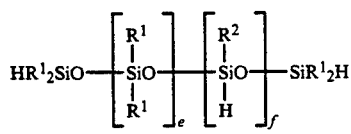 (III)

wherein $R^1$ and $R^2$ are as defined, e is an integer from 2 to 100, and f is zero or an integer up to 100.

While the $C_1$–$C_6$ alky group may by methyl, ethyl, propyl, butyl or the like, methyl and propyl are preferable from a commercial point of view. Phenyl is preferable as the substituent $R^1$, $R^2$ or $R^3$ because its presence renders component (b) more compatible with component (a). The degree of polymerization of polysiloxanes (I), (II) and (III) are defined by the recurring numbers a–f, respectively. If the degree of polymerization is too high, component (b) becomes too viscous to exhibit a satisfactory workbility and is less compatible with component (a).

Preferably component (b) includes methylhydrogenpolysiloxanes, methylpropyl-hydrogenpolysiloxanes and methylphenylhydrogenpolysiloxanes. Non-limiting specific examples thereof are listed below.

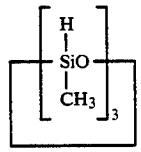

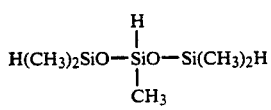

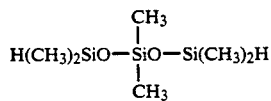

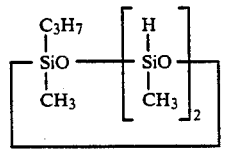

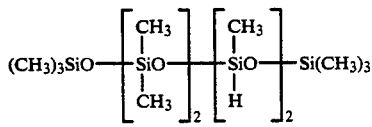

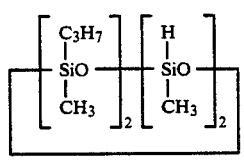

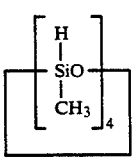

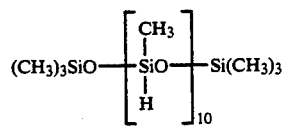

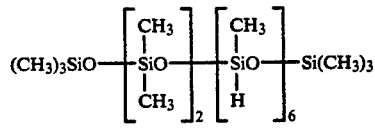

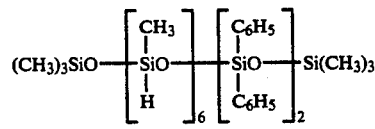

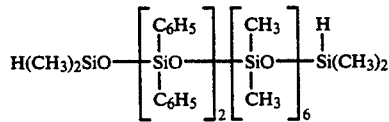

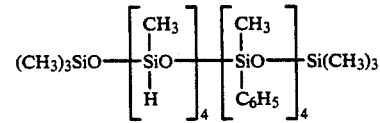

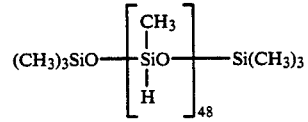

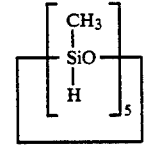

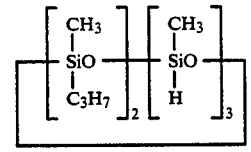

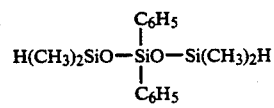

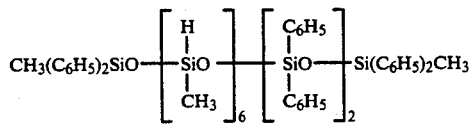

Preferable proportions of component (a) and component (b) in the composition of this invention are such that from 0.5 to 4, more preferably from 0.8 to 1.5 gram atoms of the hydrogen atom attached to the silicon atom are present per mole of the alkynyl group.

Component (c) is added as catalyst of the reaction between component (a) and component (b). Platinum catalyst having a valency from zero to 4 or equivalent Group VIII transitional metal catalysts may be used. Chloroplatinic acid is preferable from a commercial point of view. Using component (c), the composition of this invention may be cured at a relatively low temperature with no or little volumetric shrinkage. The amount of component (c) ranges between 5 and 1,000 ppm, preferably between 10 and 500 ppm relative to 100 parts by weight of the sum of component (a) and component (b). Care should be taken because excessive addition of component (c) may cause a premature curing reaction before applying or casting the composition.

The composition of this invention may be used with or without solvent. The curing reaction may be accelerated by heating though it may proceed even at room temperature. Opposed to the prior art compositions utilizing a condensation reaction of a silanol group with an alcoholic hydroxyl group or alkoxy group, the linkage formed by the curing reaction of the composition of this invention is —Si—C=C— which contributes to the promotion of the various properties of the cured product including moisture and water resistance, salt spray resistance, solvent resistance, alkali resistance, overlaying property and so on.

The composition of this invention may contain, depending upon its intended use, various auxiliary components such as pigments and other conventional additives. However, it is preferable to avoid the addition of those substances or compounds which would retard the hydrosilylating reaction such as nitrogen-, phosphorus- or arsenic-containing compounds.

When used for coating purposes, the composition of this invention may give a film having satisfactory durability, acid resistance, water resistance and other properties. When used for molding purposes, it gives a flexible product having excellent mechanical properties. Accordingly, the composition of this invention finds its use, for example, as decorative or protective coating compositions, electrical insulation material, anti-blotting top coats, molding material and so on. Furthermore, the composition of this invention allows high solids, low viscosity paints to be formulated.

The following examples are given for illustrative purposes only. All parts and percent therein are by weight unless otherwise specified.

PRODUCTION EXAMPLE A

A reactor equipped with a stirrer, reflux condenser and nitrogen gas tube was charged with 475 parts of bisphenol A epoxy resin (epoxy equivalent 190) produced from bisphenol A and epichlorohydrin, 280 parts of propargyl alcohol and 3.075 parts of tetrabutylammonium chloride. The mixture was allowed to react by heating at 120° C. until the epoxy equivalent measured by the HCl-dioxane titration method was greater than 15000. After the reaction, the mixture was evaporated in vacuo to remove unreacted propargyl alcohol. The resulting product hereinafter referred to as "Resin A" was found to have a number average molecular weight of 500 when measured by the GPC method. The IR spectorphotometry showed the absorption of propargyl group at 3300 cm$^{-1}$ and 2100 cm$^{-1}$.

PRODUCTION EXAMPLE B

Analogous to Production Example A, cresol novolac epoxy resin having an epoxy equivalent of 220 (Toto Kasei K.K., YDCN-704) was reacted with propargyl alcohol to give "Resin B". The IR spectrophotometry showed the absorption of propargyl group at 3300 cm$^{-1}$ and 2100 cm$^{-1}$.

PRODUCTION EXAMPLE C

A reactor equipped with a stirrer, nitrogen gas tube and reflux condenser was charged with 170.0 parts of bis(4-glycidyloxyphenyl)propane, 224.0 parts of propargyl alcohol and 1.0 parts of benzyldimethylamine. The mixture was allowed to react by heating at 115° C. until no epoxide function was detected by the HCl-dioxane titration method. After the reaction, unreacted propargyl alcohol was removed from the reaction mixture by evaporation in vacuo.

To the mixture were added 740.0 parts of epichlorohydrin and 4.0 parts of tetramethylammonium chloride. To the mixture heated at 50° C., 86.0 parts of 50% aqueous solution of sodium hydroxide were added dropwise over 2 hours. Then reaction was continued for additional 4 hours while removing water as an azeotropic mixture with epichlorohydrin in vacuo. After removing excessive epichlorohydrin, the reaction product was treated with toluene-water mixture to extract sodium chloride by-product in water and the toluene fraction was evaporated in vacuo to remove the solvent whereupon 2, 2-bis[4-(3-propargyloxy-2-glycidyloxypropyloxy)phenyl]propane having an epoxy equivalent of 290 was obtained.

232 parts of the compound thus obtained were further reacted with 69 parts of bisphenol A at 120° C. until the epoxy equivalent was 1,500 and then with 11.2 parts of propargylamine until no epoxide function was detected. A product referred to as "Resin C" having a number average molecular weight of 3,000 measured by the GPC method was obtained. The IR spectrophotometry of the product revealed the presence of propargyl group at 3300 cm$^{-1}$ and 2100 cm$^{-1}$.

PRODUCTION EXAMPLE D

A reactor equipped with a stirrer, reflux condenser and nitrogen gas tube was charged with 70.0 parts of xylene and heated to 100° C. To this was added a monomer mixture of 20.0 parts of styrene, 10.0 parts of acrylonitrile, 40.0 parts of 2-propargyloxycarbonyloxyethyl methacrylate and 30.0 parts of methyl methacrylate containing 10.0 parts of t-butylperoxy-2-ethylhexanoate dropwise over 2 hours. The mixture was allowed to react for an additional 6 hours at 100° C. with stirring under nitrogen gas current and then cooled to room temperature. A product referred to as "Resin D" having a number average molecular weight of 4,000 measured by the GPC method was obtained. The IR sectrometry of the product revealed the presence of propargyl group and cyano group.

PRODUCTION EXAMPLE E

A reactor as used in Production Example D was charged with 70 parts of xylene and 20 parts of butanol, and heated to 110° C. under nitrogen gas current. To this was added a monomer mixture of 10 parts of styrene, 10.7 parts of methacrylic acid, 16.7 parts of 2-ethylhexyl methacrylate, 40.1 parts of methyl methacrylate and 22.5 parts of ethyl acrylate containing 1.2 parts of t-butylperoxy-2-ethyl-hexanoate dropwise over 3 hours. After the addition, the mixture was allowed to react for additional 1 hour at 105° C. and the 0.5 parts of t-butylperoxy-2-ethylhexanoate in 10 parts of xylene were added dropwise over 30 minutes. Thereafter the mixture was allowed to react for an additional 2 hours at 105° C. At the end of the reaction, the inner temperature of the reactor was raised to 120° C. Then 14 parts of propargyl glycidyl ether containing 0.2 parts of 5 dimethylbenzylamine were added thereto dropwise over 30 minutes and allowed to react at the same temperature while monitoring the reaction percentage of carboxyl function with glycidyl function by the acid number titration. After 2 hours reaction time, a product preferred to as "Resin E" having a reaction percentage of 86% was obtained.

PRODUCTION EXAMPLE F

A reactor as used in Production Example D was charged with 80 parts of xylene and heated to 105° C. under nitrogen gas current. To this was added dropwise a monomer mixture of 13.9 parts of methacryloyl isocyanate, 28.4 parts of 2-ethylhexyl methacrylate, 34.6 parts of methacrylic acid and 23.2 parts of ethyl acrylate containing 1.2 parts of t-butylperoxy-2-ethylhexanoate over 3 hours. After the addition, the mixture was allowed to react for additional 1 hour at 105° C. and then 0.5 parts of t-butylperoxy-2-ethylhexanoate in 20 parts of xylene were added dropwise over 30 minutes. Thereafter the mixture was allowed to react again for an additional 2 hours at 105° C. After cooling the mixture to 50° C. and diluting with 20 parts of butyl acetate, 8.0 parts of propargyl alcohol were added dropwise over 30 minutes and allowed to react at the same temperature. After 30 minutes reaction time, the absorption of NCO group at 2230 cm$^{-1}$ disappeared completely by the IR spectrometry showing a 100% reaction percentage of the NCO function with propargyl alcohol. The resulting product is hereinafter referred to as "Resin F".

PRODUCTION EXAMPLE G

A reactor equipped with a decanter was charged with 53.4 parts of isophthalic acid, 26.7 parts of neopentyl glycol, 17.8 parts of neopentyl glycol hydroxypivalate, 1.6 parts of trimethylolpropane and 0.05 parts of dibutyltin oxide. The reactants were allowed to react at an initial temperature of 150° C. Then the temperature was gradually raised up to 210° C. over 10 hours until an acid number of 5.0 was reached. Thereafter the reaction mixture was allowed to cool to 120° C. and 17.1 parts of trimellitic acid were added thereto in portions and allowed to react for 1 hour. Then a solution of 11.0 parts of propargyl glycidyl ether and 0.2 parts of dimethylbenzylamine in 31 parts of xylene was added to the reactor and allowed to react for an additional 2 hours whereupon an acid number of 5.0 as solids was reached. This product was diluted with 54 parts of xylene and is hereinafter referred to as "Resin G".

PRODUCITON EXAMPLE H

In a reactor equipped with a stirrer, thermometer, nitrogen gas tube and reflux condenser was made a solution containing 19.0 parts of 2, 2-bis(4-hydroxyphenyl)propane, 2.39 parts of deionized water, 7,18 parts of sodium hydroxide, 0.162 parts of tetrabutylammonium bromide and 78.65 parts of dioxane. To the solution were added 21.36 parts of propargyl bromide dropwise and allowed to react at 80° C. for 4 hours. Then the reaction mixture was evaporated in vacuo to remove dioxane, and then treated with ether-water mixture and 1N NaOH successively. The etherial layer was separated and dried over magnesium sulfate overnight. After filtering off magnesuim sulfate, the etherial layer was evaporated in vacuo to dryness. The residue was recrystallized to give 2, 2-bis(4-propargyloxyphenyl) propane hereinafter referred to as "Resin H".

PRODUCTION EXAMPLE I

Analogous to Production Example H, neopentyl glycol dipropargyl ether was produced from neopentyl glycol and propargyl bromide. The product is hereinafter referred to as "Resin I".

PRODUCTION EXAMPLE J

Analogous to Production Example H, 2, 2-bis(4-propargyloxycarbonylphenyl)methane was produced from 2, 2-bis(4-hydroxyphenyl)methane and propargyl chloroformate. The product is hereinafter referred to as "Resin J".

PRODUCTION EXAMPLE K

For Comparison

A reactor as used in Production Example D was charged with 40 parts of xylene and 20 parts of butanol and then heated to 110° C. under nitroen gas current. To this was added dropwise a monomer mixture of 15 parts of styrene, 3.1 parts of methacrylic acid, 34.1 parts of 2-etylhexyl methacrylate and 16.2 parts of 2-hydroxyethylmethacrylate containing 1.2 parts of t-butylperoxy-2-ethylhexanoate over 3 hours. After the addition the mixture was allowed to react at 105° C. for 1 hour. Then 0.2 parts of t-butylperoxy-2-ehtylhexanoate in 6.7 parts of xylene were added dropwise over 30 minutes and the mixture was allowed to react again for an additional 2 hours at 105° C. The product is hereinafter referred to as "Resin K".

PRODUCTION EXAMPLE L

For Comparison

A reactor as used in Production Example G was charged with 53.4 parts of isophthalic acid, 26.7 parts of neopentyl glycol, 17.8 parts of neopentyl glycol hydroxypivalate, 1.6 parts of trimethylolpropane and 0.05 parts of dibutyltin oxide. The reactants were allowed to react at an initial temperature of 150° C. Then the temperature was gradually raised up to 210° C. over 10 hours until an acid number of 5.0 was reached. The product was diluted with 55 parts of xylene and is hereinafter referred to as "Resin L".

EXAMPLE 1

10 parts of Resin A produced in Production Example A, 20 parts of methylphenylhydrogenpolysiloxane of the formula:

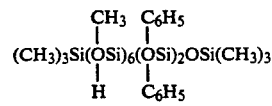

and 0.1 parts of a 2% ethanolic solution of chloroplatinic acid were thoroughly mixed, applied on a steel plate to a dry film thickness of 20 micron and baked at 180° C. for 20 minutes. Properties of the resulting cured film are shown in Table 1.

EXAMPLE 2

80 parts of Resin B solution produced in Production Example B, 20 parts of 1, 3, 5, 7-tetramethyl-1-propylcyclotetrasiloxane and 0.1 parts of a 20% ethanolic solution of chloroplatinic acid were thoroughly mixed, applied on a steel plate to a dry film thickness of 20 micron and baked a 180° C. for 20 minutes. Properties of the resulting cured film are shown in Table 1.

EXAMPLES 3–10

The preceeding Examples were repeated using formulations shown in Table 1. The results obtained are also shown in Table 1.

COMPARATIVE EXAMPLE 1

100 parts of Resin K produced in Production Example K and 43 parts of SUPER BEKKAMIN L-127 (melamine resin sold by Dainippon Ink And Chemicals, Inc.) were thoroughly mixed, applied on a steel plate to a dry film thickness of 20 micron and baked at 180° C. for 20 minutes. Properties of the resulting cured film are shown in Table 2.

COMPARATIVE EXAMPLE 2

100 parts of Resin K produced in Production Example K, 25 parts of VERNOCK D-950 (polyisocyanate sold by Dainippon Ink And Chemicals, Inc.) and 0.1 parts of dibutyltin oxide were thoroughly mixed, applied on a steel to a dry film thickness of 20 micron and cured at 25° C. for one week. Properties of the resulting cured film are shown in Table 2.

COMPARATIVE EXAMPLE 3

100 parts of Resin L produced in Production Example L and 43 parts of SUPER BEKKAMIN L-127 were thoroughly mixed, applied on a steel plate and baked at 180° C. for 20 minutes. Properties of the resulting cured film are shown in Table 2.

TABLE 1

|  | Example | | | | |
|---|---|---|---|---|---|
|  | 1 | 2 | 3 | 4 | 5 |
| Resin (parts) | A 70 | B 80 | C 70 | D 70 | E 70 |
| Hydrogenpolysiloxane (parts) | I[1)] 30 | II[2)] 20 | I 30 | I 30 | I 30 |
| Chloroplatinic acid[3)] (parts) | 0.1 | 0.1 | 0.1 | 0.1 | 0.1 |
| Pencil hardness[4)] | 2H | 2H | H | H | H |
| Solvent resistance[5)] | No change | No change | No change | No change | No change |
| Acid resistance[6)] | Good | Good | Good | Good | Good |
|  | 6 | 7 | 8 | 9 | 10 |
| Resin (parts) | F 70 | G 70 | H 70 | I 70 | J 70 |
| Hydrogenpolysiloxane (parts) | I 30 | I 30 | I 30 | I 30 | I 30 |
| Chloroplatinic acid (parts) | 0.1 | 0.1 | 0.1 | 0.1 | 0.1 |
| Pencil hardness | H | H | 2H | 2H | 2H |
| Solvent resistance | No change | No change | No change | No change | No change |
| Acid resistance | Good | Good | Good | Good | Good |

TABLE 2

|  | Comparative Example | | |
|---|---|---|---|
|  | 1 | 2 | 3 |
| Resin (parts) | K 100 | K 100 | L 100 |
| Crosslinker (parts) | MF[7)] 43 | NCO[8)] 25 | MF 43 |
| Pencil hardness | 2H | H | H |
| Solvent resistance | No change | No change | No change |
| Acid resistance | Whitening | Trace | Whitening |

Footnotes 1) (CH$_3$)$_3$Si(OSi)$_6$(OSi)$_2$OSi(CH$_3$)$_3$ with CH$_3$, C$_6$H$_5$ groups on first OSi$_6$ and H, C$_6$H$_5$ on OSi$_2$.

2) 1,3,5,7-tetramethyl-1-propylcyclotetrasiloxane.
3) 2% ethanic solution of chloroplatinic acid.
4) According to JIS K 5400 6-14.
5) According to xylene rubbing test. The film is rubbed with a cotton wool piece impregnated with xylene at 50 reciprocations and the change of appearance, if any, is observed visually.
6) One drop (0.2 ml) of 0.1N sulfuric acid is placed on the film and allowed to stand overnight at 20° C. at 75% R.H. Thereafter the film is dried at 60° C. for 10 minutes. The state of deterioratio of the film is visually observed.
7) Melamine-formaldehyde resin.
8) Organic polyisocyanate.

We claim:

1. A curable resin composition comprising:
   (a) an acrylic, polyester epoxy or polyether polyol resin having a number average molecular weight from 200 to 100,000 and a plurality of alkynyl groups in the molecule;
   (b) an organohydrogenpolysiloxane having a plurality of silicon-hydrogen bonds in the molecule; and
   (c) a catalytically effective amount of a platinum catalyst.

2. The curable resin composition according to claim 1, wherein said number average molecular weight is from 500 to 50,000.

3. The curable resin composition according to claim 1, wherein said alkynyl group-containing acrylic resin is a homopolymer of an alkynyl group-containing acrylic monomer or a copolymer of said alkynyl group-containing acrylic monomer with another monomer copolymerizable therewith.

4. The curable resin composition according to claim 1, wherein said alkynyl group-containing acrylic resin is a reaction product of a hydroxy group-containing acrylic polymer with a alkynyl chloroformate or an alkynoic acid.

5. The curable resin composition according to claim 1, wherein said alkynyl group-containing acrylic resin is a reaction product of an isocyanato group-containing acrylic polymer with an acetylenic alcohol.

6. The curable resin composition according to claim 1, wherein said alkynyl group-containing acrylic resin is a reaction product of a carboxyl group-containing acrylic polymer with an alkynyl group-containing epoxy compound.

7. The curable resin composition according to claim 1, wherein said alkynyl group-containing acrylic resin is a reaction product of an epoxide group-containing acrylic polymer with an alkynoic acid.

8. The curable resin composition according to claim 1, wherein said alkynyl group-containing polyester resin is a polycondensate of a polycarboxylic acid, a polyol and an acetylenic alcohol.

9. The curable resin composition according to claim 1, wherein said alkynyl group-containing polyester resin is a reaction product of a carboxyl group-terminated polyester with an alkynyl group-containing epoxy compound.

10. The curable resin composition according to claim 1, wherein said alkynyl group-containing polyester resin is a reaction product of a hydoxyl group-terminated polyester with an alkynoic acid.

11. The curable resin composition according to claim 1, wherein said alkynyl group-containing epoxy resin is a reaction product of an epoxy resin with an alkynoic acid, alkynyl amine or acetylenic alcohol.

12. The curable resin composition according to claim 1, wherein said alkynyl group-containing epoxy resin is a reaction product of a hydroxyl group-containing epoxy resin with an alkynyl chloroformate.

13. The curable resin composition according to claim 1, wherein said alkynyl group-containing polyether polyol resin is a reaction product of a polyether polyol with a alkynyl halide or alkynyl chloroformate.

14. The curable resin composition according to claim 1, wherein said organohydrogenpolysiloxane has the formula:

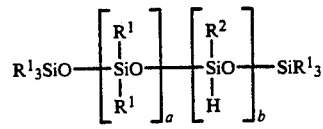

wherein $R^1$ and $R^2$ are each independently a $C_1$–$C_6$ alkyl or phenyl, a is zero or an integer of up to 100, and b is an integer from 2 to 100.

15. The curable resin composition according to claim 1, wherein said organohydrogenpolysiloxane has the formula:

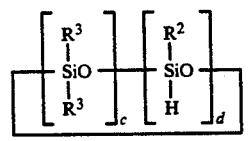

wherein $R^2$ and $R^3$ are each independently a $C_1$–$C_6$ alkyl or phenyl, c is zero or an integer of 1 to 8, d is an integer from 2 to 10, and the sum of c+d equals to 3 to 10.

16. The curable resin composition according to claim 1, wherein said organohydrogenpolysiloxane has the formula:

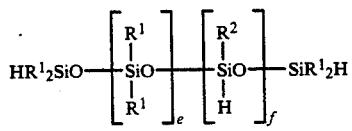

wherein $R^1$ and $R^2$ are each independently a $C_1$–$C_6$ alkyl or phenyl, e is an integer from 2–100 and f is zero or an integer of 1 up to 100.

17. The curable resin composition according claim 1, wherein said platinum catalyst is chloroplatinic acid.

18. The curable resin composition according to claim 1, wherein the proportions of said component (a) and component (b) in said composition is such that 0.5 to 4 gram atoms of the hydrogen atom attached to the silicon atom are present per mole of the alkynyl group.

19. The curable resin composition according to claim 1, wherein said component (c) is present in said composition in an amount between 5 to 1,000 ppm relative to 100 parts by weight of the sum of component (a) and component (b).

* * * * *